United States Patent [19]

Legendre et al.

[11] Patent Number: 5,263,758
[45] Date of Patent: Nov. 23, 1993

[54] VEHICLE SEAT LOCK

[75] Inventors: Dominique Legendre, Spay; Valentin Ozanic; Jacky Faligand, both of Clayes S/Bois, all of France

[73] Assignee: Matra Automobile, France

[21] Appl. No.: 856,164

[22] PCT Filed: Jul. 26, 1991

[86] PCT No.: PCT/FR91/00624
§ 371 Date: May 15, 1992
§ 102(e) Date: May 15, 1992

[87] PCT Pub. No.: WO92/02384
PCT Pub. Date: Feb. 20, 1992

[30] Foreign Application Priority Data

Aug. 1, 1990 [FR] France ............... 90 09841

[51] Int. Cl.⁵ .............................................. B60N 2/04
[52] U.S. Cl. ...................... 296/68; 296/68.1; 297/336; 297/344.1; 248/503.1
[58] Field of Search .............. 296/63, 65.1, 68, 68.1; 297/335, 336, 344; 248/503.1

[56] References Cited

U.S. PATENT DOCUMENTS

| | | | |
|---|---|---|---|
| 2,815,796 | 12/1957 | Lobanoff | 296/68.1 |
| 3,542,325 | 11/1970 | Schwenk | 297/335 X |
| 4,257,647 | 3/1981 | Gianessi | 297/336 |
| 4,438,969 | 3/1984 | Kamijo et al. | 296/65.1 |
| 4,770,459 | 9/1988 | Nakaiwa et al. | 296/65.1 |
| 4,946,216 | 8/1990 | Demick | 248/503.1 X |

FOREIGN PATENT DOCUMENTS 3621642 11/1986 Fed. Rep. of Germany .
1218427 1/1971 United Kingdom .

Primary Examiner—Dennis H. Pedder
Attorney, Agent, or Firm—Larson and Taylor

[57] ABSTRACT

A locking device for preventing a seat from coming loose when the vehicle is moving includes a plate provided with at least one recess (3) for receiving the leg of a seat, and at least one sliding block (4) having at least one open L-shaped notch (5) and able to move between a position in which the open portion of the notch faces the recess and provides a passage for a transverse pin located on said leg, and a locking position in which the closed portion of the notch (5) faces said recess and prevent said pin from being freed, a device (7) urges the sliding block towards its locking position.

7 Claims, 3 Drawing Sheets

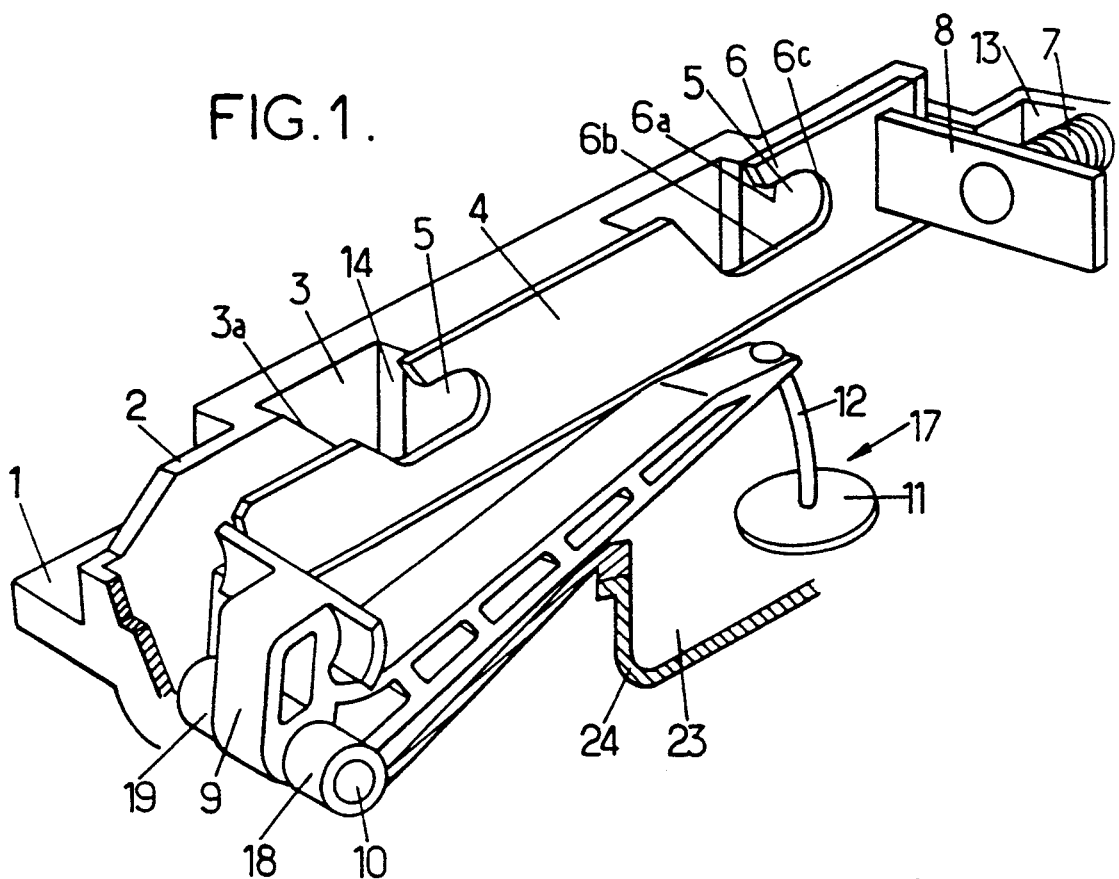
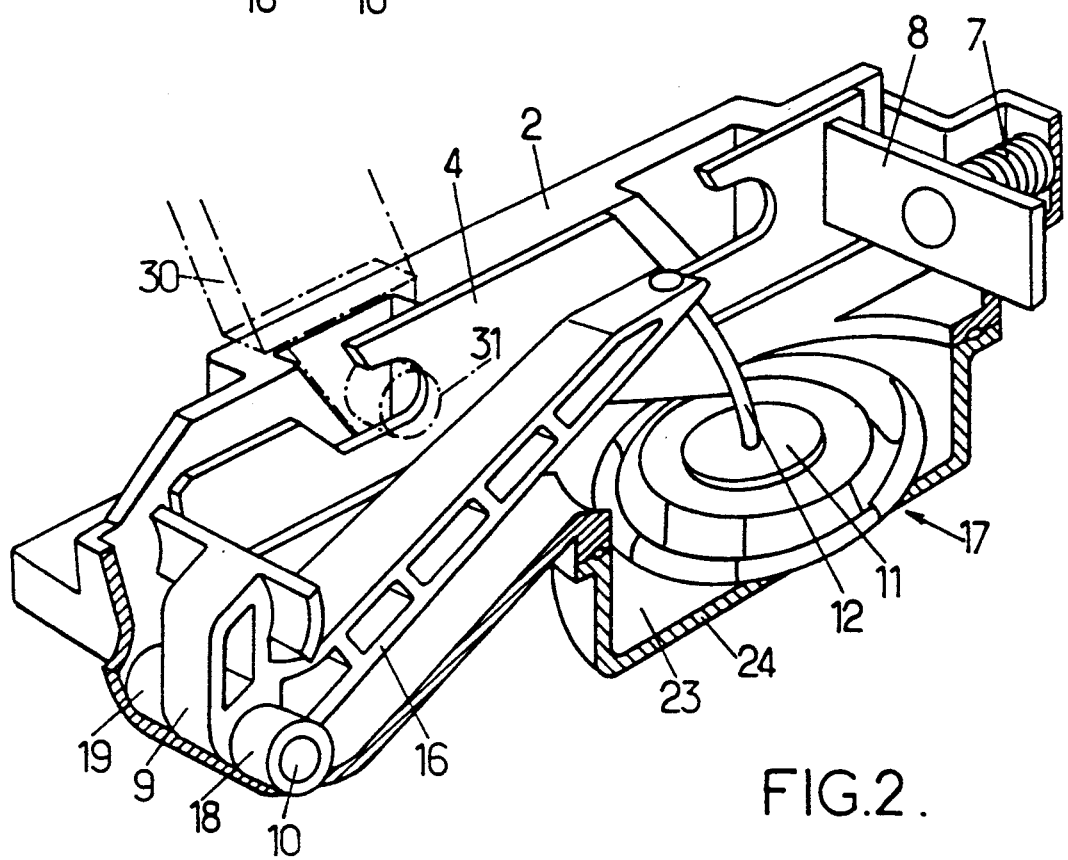

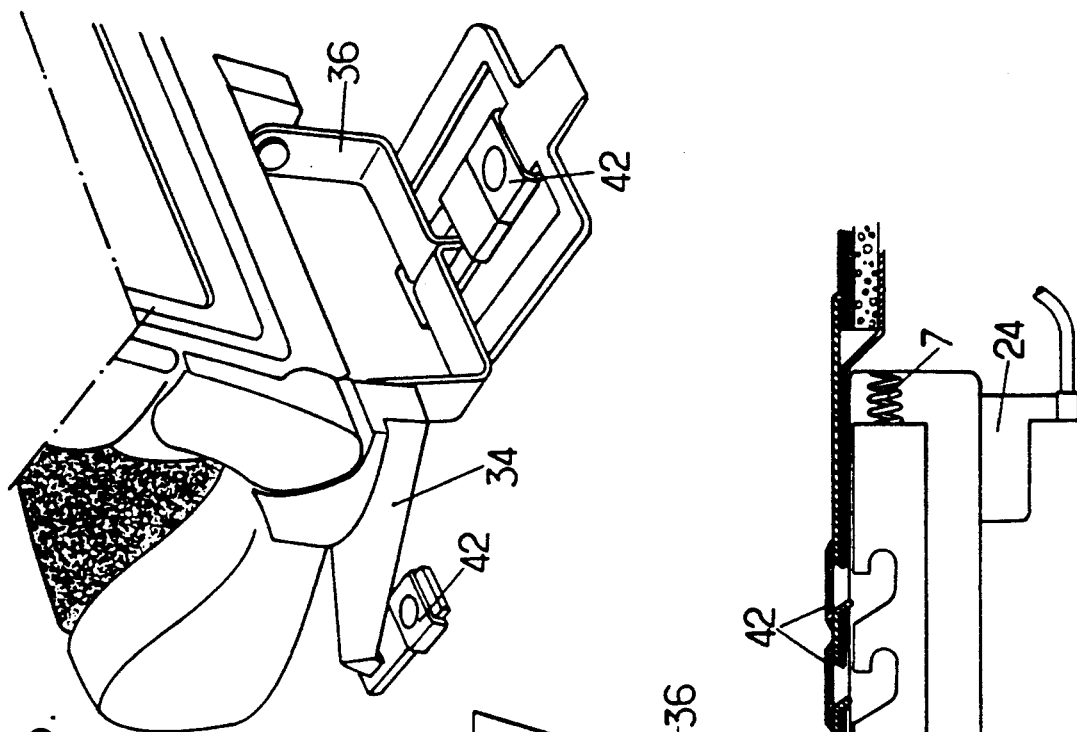
FIG.6.
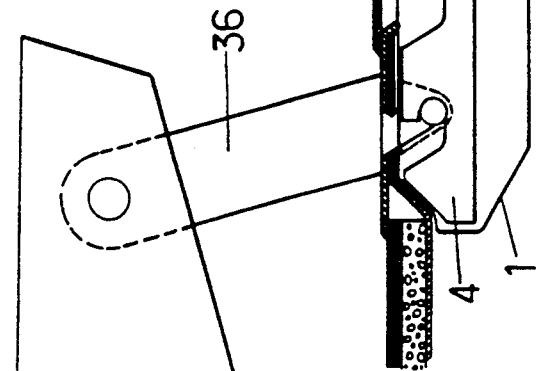
FIG.8.
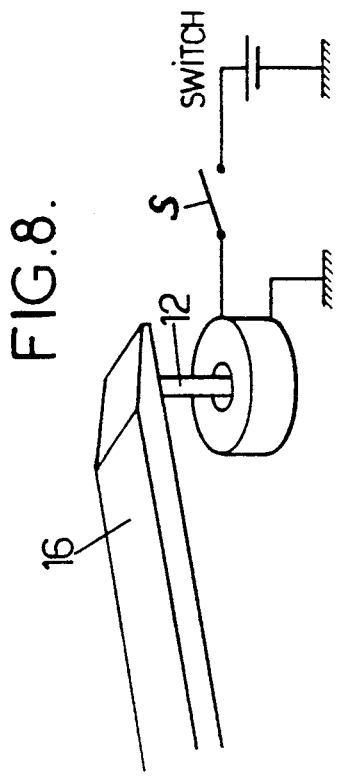
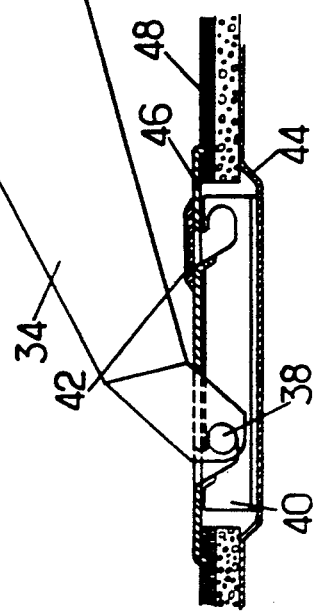
FIG.7.

VEHICLE SEAT LOCK

BACKGROUND OF THE INVENTION

The present invention is concerned with seat locks on the floor of a vehicle.

In certain vehicles, the seats, particularly the back seats, can be displaced to provide a variable configuration of the vehicle. The seats must therefore be secured to the floor of the vehicle using detachable fastener components. The fastener components most widely used today are snap action mechanisms which are often time-consuming to use and which do not always comply with safety standards, particularly since these mechanisms are accessible to the occupant of the seat while he is riding in the vehicle, thereby allowing the occupant to be able to accidentally unlock his seat.

SUMMARY OF THE INVENTION

The invention aims to provide an improved seat lock compared to those existing to date. More particularly, it aims to achieve one of the following results: to construct a device having a small overall vertical dimension providing a reliable locking, yet which is easy to release; to construct a seat lock which cannot be easily released accidentally by the occupants of the vehicle; to provide a seat lock which can be released only when the vehicle is a situation not normally found when the vehicle is running.

For this purpose, the invention proposes a seat lock for a vehicle seat leg including a lock plate fitted with at least one recess for receiving the seat and at least one slide fitted with at least one open L-notch, guided in the lock plate to be able to be displaceable between a position where the open branch of the notch is facing the recess and frees a groove for a transversal finger of the leg and a locking position in which the closed branch of the notch is facing the recess and prohibits the finger from being released, mechanisms being provided to pull the slide toward the locking position or to secure it. The mechanisms for pulling the slide toward the locking position may consist of one or more return springs, such a device may be provided so that it cannot be easily released manually and cannot be released accidentally. This result may be achieved using a strong return spring, due to the impossibility of manually exerting on the slide a force separating its locking position or using other mechanisms.

The mechanisms for overcoming or compensating the action of the return spring may have very diverse designs. They may be constructed with an activator capable of exerting a force on the slide against that of the return spring. This activator may be an electromagnetic actuator or a pneumatic element. In the second case, the energy source may be provided by a depression to the suction of the motor or by the pressure produced by a side compressor.

The seat locking conditions will advantageously consist of opening a door of the vehicle. This door may, for example, be any door, or one of those which correspond to the row occupied by the seat to be unlocked (the back door of a passenger vehicle or of a commercial vehicle, for example).

In the case of an electric activator, the unlocking will, for example, be controlled by a door switch, when the contact key has been turned on.

In the case of a pneumatic activator, the unlocking will be controlled, for example, by the opening of a door, controlling the opening of a electrovalve the connecting activator and a depression source, such as a tank connected to the suction of the motor.

There is further provided a seat lock including a lock plate fitted with at least one recess for receiving a seat leg in which an element is displaceable by an activator from a leg locking position, toward which it is pushed back using return mechanisms and in which it prohibits the leg from leaving the recess, until an unlocking position is reached. The activator is only controlled when a condition is fulfilled. This condition normally only exists when the vehicle is stopped and may consist of opening a door.

The invention will be more clearly understood by reading the following description of a particular embodiment mode, provided as an example without limitation.

DESCRIPTION OF THE DRAWINGS

FIGS. 1 and 2 are bird's eye and partial sectional views of the mechanical and pneumatic parts of a seat lock, respectively in unlocked and locked positions;

FIG. 6 is a bird's eye view showing a possible mounting of a device of the type illustrated in FIG. 4 used for securing the back leg of an automobile seat;

FIG. 7 is a longitudinal sectional view showing the various positions of the seat shown in FIG. 6 when it is fitted with a back leg lock.

FIG. 8 is a schematical representation of an electromagnetic actuator which may be substituted for the actuator of FIG. 1.

DESCRIPTION OF EMBODIMENTS

Figure 3:
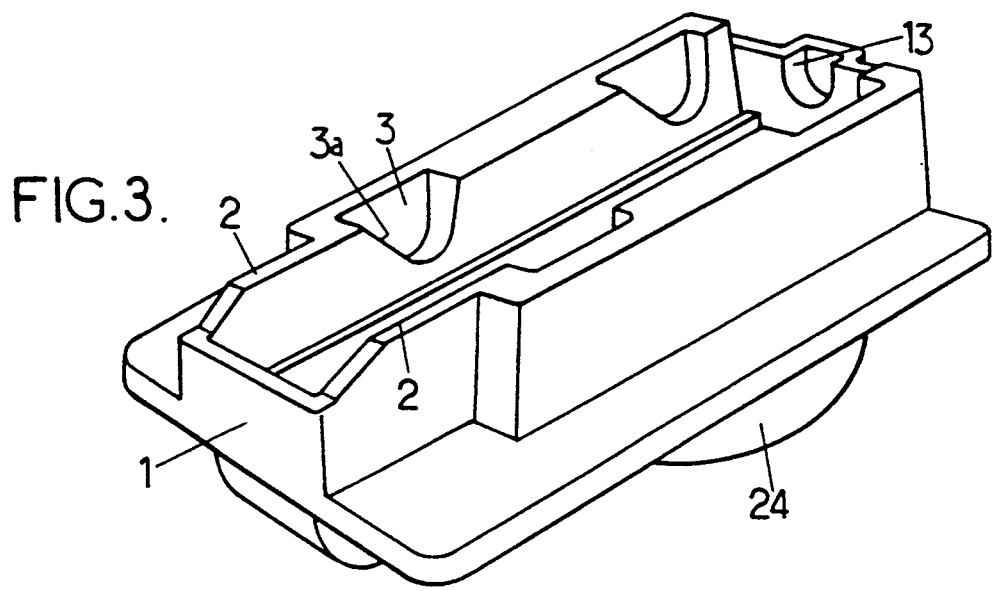
FIG. 3 is a bird's eye view showing the lock plate of the device of FIGS. 1 and 2.

The lock shown in FIGS. 1 to 3 include lock plate (1) designed to be permanently fastened under the floor of a vehicle. Lock plate (1) includes two side walls (2) formed with notches or recesses (3). The lock plate of FIGS. 1 to 3 includes a two sets of recesses having a V-pattern. The point of the V is rounded and is designed to fit the pattern of an element integral with a seat leg which is introduced into it. FIG. 2 shows, in dotted lines, a fraction of seat leg (30) designed to be inserted in notch (3), as well as a finger or transversal locking component (31) fastened to the leg.

Slide (4) is placed between walls (2) of the lock plate. Grooves (not shown) or a lock plate cover allow it to displace only in a longitudinal direction, i.e. orthogonally to the direction in which the leg is inserted. Notches (5) are provided in the slide having a branch which opens up toward the top and a closed branch, essentially parallel to the direction of the displacements of the slide. This oblong-shape branch is delimited by a projecting nose (6).

Slide (4) bears plate (8) subjected to the action of elastic return mechanisms (7). In the case illustrated in FIGS. 1 and 2, the elastic mechanism consists of a spring compressed between plate (8) and the lock plate, tending to push back the slide toward the position where it is shown in FIG. 2. The return spring may be secured in position, in an axial direction, by a teat fastened to plate (8) and a notch (13) provided in the lock plate.

The device of FIGS. 1 and 2 also include an L-shaped lever, with one branch connected to activator (17) and one support branch on slide (4). This lever is mounted upon pivoting axis (10) which, in the case illustrated, rest upon the base of the plate by sleeves (18 and 19). These sleeves are made up of a material capable of being pulled to allow them to be mounted upon the axis, then of tightening to secure the lever on the axis.

Figure 4:
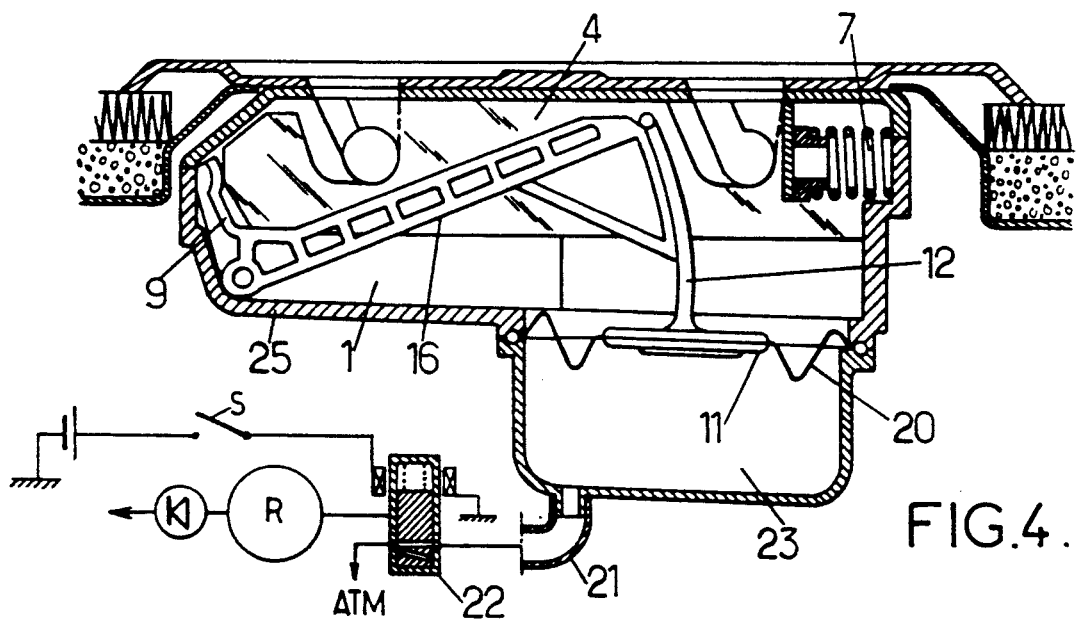
FIGS. 4 and 5 are longitudinal sectional views of the devices constituting embodiments of the activator of FIGS. 1 and 2.

Activator (17) is provided to exert a force greater than that of elastic return mechanism (7) and to displace the slide from the position shown in FIG. 2 to the position shown in FIG. 1. It may have highly diverse designs. The slides shown as examples in FIGS. 1, 2, 4 and 5 are controlled pneumatically. In the case of FIGS. 2 and 4, this activator (17) includes a basin-shaped body, whose edge is applied against a circular edge of the lock plate while pinching the rim of deformable membrane (20). The central part of the membrane is clamped between two cups. Back cup (11) is connected to the longest arm of the L-lever (16) by link (12) showing enough bending flexibility to tolerate the relative displacements of the cup and lever.

Chamber (23) defined by membrane (20) and body (24) is provided to be connected either to the atmospheric pressure, or to a depression source. In the case illustrated schematically in FIG. 4, body (24) is fitted with a connector to pipe (21). This pipe is connected in turn, by electrovalve (22), either to a vacuum source, or to the atmosphere. The vacuum source may consist of a tank R connected to the introduction passage of the motor via a check valve. Electrovalve (22) is fed via a switchs (FIG. 4) which closes when a door is open. It then passes from the position shown in FIG. 4 to the position for which it connects chamber (23) to the tank R.

When chamber (23) of the activator is at atmospheric pressure, the elastic return mechanisms keep slide (4) and lever (9) in the position shown in FIGS. 2 and 4. Recesses (3) are then arranged to face the closed branch of the notches of slide (4). The locking finger of the leg is then locked between edges (3a, 6a, 6b, 6c) of the lock plate and of the slide (FIG. 1).

To release the seat, chamber (23) must be in a state of depression which implies, in the case just described, that the motor is running and that a door is open. The differential pressure exerted on membrane (20) displaces the cup to the bottom of body (24). Cup (11) displaces lever (9) and the latter pushes slide (4) back into a position where the open branch of notch (5) faces the recess or recesses (3). It is then possible to extract the seat leg.

Figure 5:
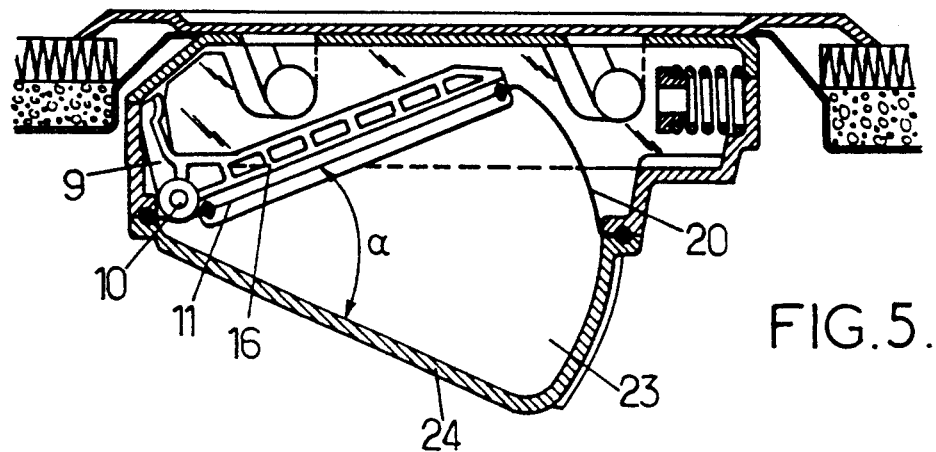

In the modified embodiment shown in FIG. 5, cup (11) of the activator is placed directly under the long branch (16) of lever (9). Membrane (20) must therefore have a shape allowing it to follow the angular clearance of the lever over the entire angle shown in FIG. 5.

FIG. 6 shows, for example, the mounting of a device for locking the frame of a seat having base (34) with two front legs of the seat and fork (36) bearing a back leg. Each of the front legs has transversal finger (38) capable of fitting in an L-notch of the lock plate (40). Lock plate (40) shown in FIG. 7 has two notches and therefore is suitable for selecting the seat position. The unused notch may be closed by guard (42). The lock plate is supported by floor (44) of the vehicle and covered by cover (46) resting against carpet (48).

The central leg of the back fork (36) also bears locking finger (31) and can fit inside any of the three recess spaces of lock plate (1). Here again, the unused spaces may be closed by guards (42). When slide (4) is in the forward position, it prohibits leg (36) from being removed.

We claim:

1. A locking device for a vehicle seat leg having a transversal finger, comprising:
   a stationary lock plate formed with at least one upwardly opening recess of sufficient size to receive said leg;
   at least one slide movable along said lock plate along a predetermined direction and formed with at least one L-shaped notch of sufficient width to receive said transversal finger, having an upwardly extending and opening branch and having a closed branch extending substantially along said direction, said slide being movable between a first position wherein said upwardly extending branch confronts said recess and clears an insertion and removal path for said transversal finger and a second position in which said closed branch confronts the recess and prevents removal of said finger out of said recess;
   resilient means for forcing said slide into said second position; and
   a power mechanism energizable responsive to a predetermined condition of a vehicle in which the locking device is mounted for exerting a force biasing said slide into the first position thereof against the resilient means.

2. Locking device according to claim 1, wherein said mechanism comprises one of an electromagnetic actuator and pneumatic actuator arranged to be energized upon occurrence of said predetermined condition of said vehicle provided with said locking device.

3. Device according to claim 2, wherein said pneumatic actuator is connected to an induction passage of an engine for energization of said actuator upon operation of said engine.

4. Device according to claim 2, wherein said mechanism includes a lever pivotably connected to said stationary lock plate, having a first arm in abutting connection with said slide and another arm connected to said actuator.

5. Device according to claim 2, wherein said actuator is energized responsive to opening of a door of said vehicle, said opening constituting said predetermined condition.

6. A locking device for a vehicle seat leg having a transversal finger, comprising:
   a stationary lock plate formed with at least one upwardly opening recess of sufficient size to receive said leg;
   at least one slide movable along said lock plate along a predetermined direction and formed with at least one L-shaped notch having an upwardly extending and opening branch and having a closed branch extending substantially along said direction, said slide being movable between a first position in which said upwardly extending branch confronts said recess and clears an insertion and removal path for said transversal finger and a second position in which said closed branch confronts the recess and prevents removal of said finger out of said recess;
   resilient means continuously exerting a force biasing said slide into said first position;
   a power mechanism energizable for pulling said slide into the second position thereof against the force of said resilient means;

and means for energizing said power mechanism responsive to occurence of a predetermined condition in a vehicle receiving said vehicle seat.

7. A lock assembly for a vehicle seat having a front leg and at least one back leg, each of said legs having a transverse finger, including a locking device for each said leg, wherein the locking device of said at least one back leg comprises:

a stationary lock plate formed with at least one upwardly opening recess of sufficient size to receive the respective leg, one slide formed with at least one L-shaped notch having an upwardly extending and opening branch and a closed branch extending substantially horizontally, and wherein the slide in said locking device for the rear leg is movable between a first position wherein said upwardly extending branch confronts said recess and clears an insertion and removal path for said transversal finger and a second position in which said closed branch confronts the recess and prevents removal of said leg out of said recess; resilient means are provided for forcing said slide into said second position; and a power mechanism is energizable for exerting a force biasing said slide into the first position thereof against the resilient means, the locking device for the front leg prevents the front leg from being removed as long as the slide is in the second position and retains the at least one back leg.

* * * * *